W. V. TURNER.
BOOSTER VALVE DEVICE FOR FLUID PRESSURE BRAKES.
APPLICATION FILED MAY 17, 1916.
1,294,972.
Patented Feb. 18, 1919.
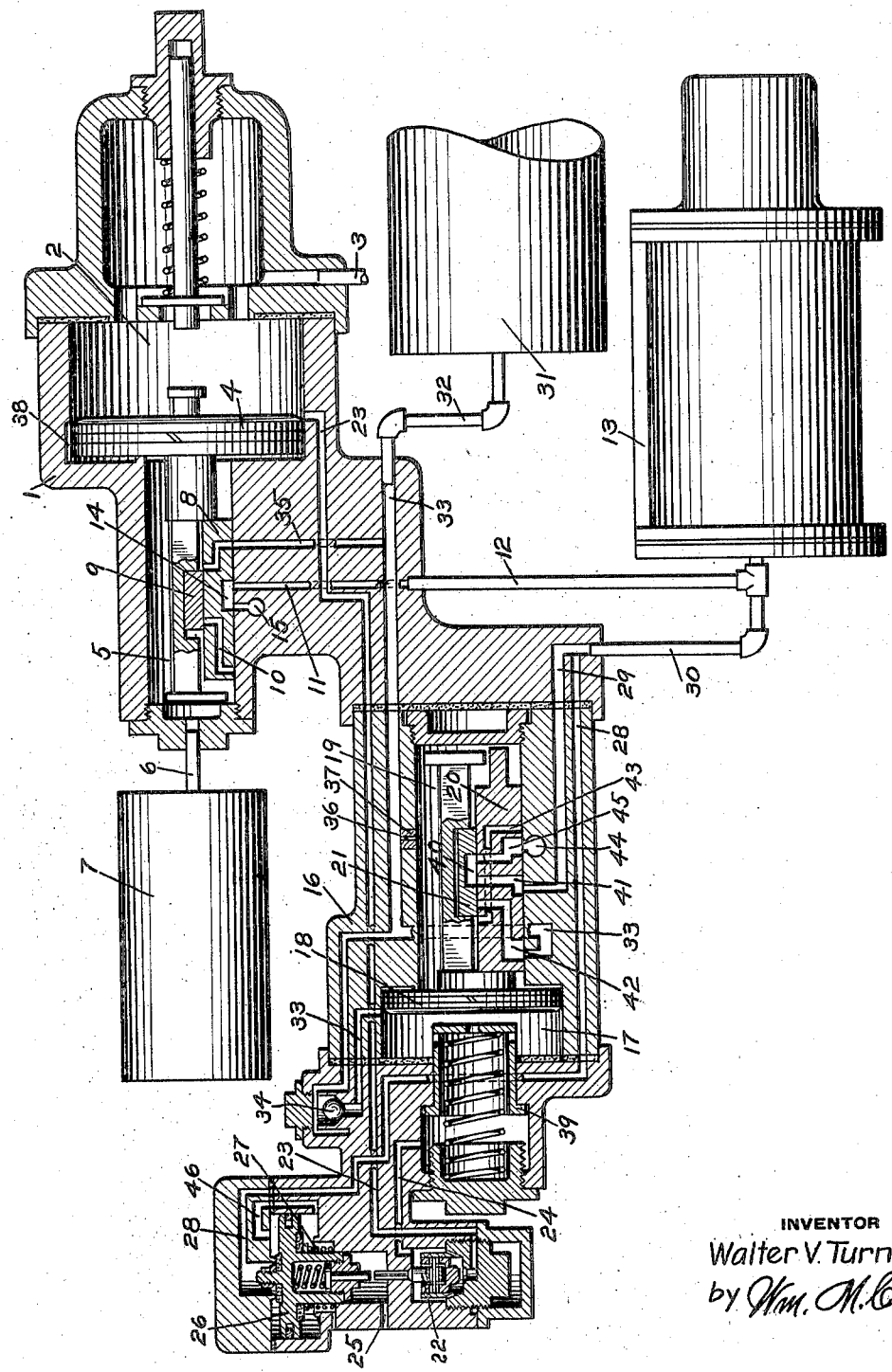
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BOOSTER-VALVE DEVICE FOR FLUID-PRESSURE BRAKES.

1,294,972.

Specification of Letters Patent. Patented Feb. 18, 1919.

Application filed May 17, 1916. Serial No. 98,053.

*To all whom it may concern:*

Be it known that I, WALTER V. TURNER, a citizen of the United States, residing at Wilkinsburg, in the county of Allegheny and State of Pennsylvania, have invented new and useful Improvements in Booster-Valve Devices for Fluid-Pressure Brakes, of which the following is a specification.

This invention relates to fluid pressure brakes, and more particularly to a valve device for augmenting the brake cylinder pressure in applying the brakes.

With the ordinary standard fluid pressure brake apparatus, when a predetermined reduction in brake pipe pressure is made to effect an application of the brakes, the brake cylinder pressure obtained will vary in accordance with the brake cylinder volume and the size of the auxiliary reservoir and it has heretofore been proposed to provide means for supplying fluid to the brake cylinder in addition to that normally supplied by the operation of the usual brake apparatus in applying the brakes, for the purpose of compensating for variations in brake cylinder volume and size of auxiliary reservoir, so that the desired brake cylinder pressure will always be obtained for a given brake pipe reduction.

The principal object of the present invention is to provide an improved device of the above character, which will be prompt and reliable in action.

In the accompanying drawing the single figure is a view, partly in section, of a car air brake equipment embodying my invention.

While the invention may be employed in connection with various types of brake controlling valve devices, in order to more easily understand the same, the invention is shown applied in connection with an ordinary triple valve device comprising a casing 1 having a piston chamber 2 connected to brake pipe 3 and containing a piston 4, and having a valve chamber 5 connected by pipe 6 to auxiliary reservoir 7 and containing main slide valve 8 and graduating valve 9 adapted to be operated by piston 4.

The slide valve 8 has the usual service port 10 controlled by the graduating valve 9 for supplying fluid from the auxiliary reservoir 7 through passage 11 and pipe 12 to brake cylinder 13, and exhaust cavity 14 for connecting said passage 11 to the exhaust port 15.

The valve device for boosting the brake cylinder pressure may comprise a casing 16 adapted to be secured to the triple valve casing 1 and having a piston chamber 17 containing a piston 18 and a valve chamber 19 containing a slide valve 20 and an auxiliary valve 21 adapted to be operated by piston 18.

The valves 20 and 21 control the supply of additional fluid to the brake cylinder and the operation of piston 18 is controlled by a double beat valve 22 adapted in one position to connect a passage 23 with passage 24 leading to piston chamber 17 and in the opposite position to connect said chamber through passage 24 with an atmospheric exhaust port 25.

The double beat valve 22 is adapted to be operated by a piston 26 which is normally seated in one direction by a spring 27 and is moved to an opposite seat by brake cylinder pressure supplied through a passage 28 which may be connected to a passage 29 leading to a brake cylinder pipe 30.

Supplemental reservoir 31 is connected by pipe 32 and passage 33 containing check valve 34 to piston chamber 17, when piston 18 is in release position, and the usual graduated release passage 35 leading to the seat of slide valve 8 is connected to passage 33. A restricted port 36 in choke plug 37 connects passage 33 with valve chamber 19 and said passage also leads to the seat of slide valve 20.

In operation, when fluid is supplied to the brake pipe 3, the piston chamber 2 is charged and fluid flows through the usual feed groove 38 around the triple valve piston 4 to valve chamber 5, charging the auxiliary reservoir 7. Fluid also flows through the quick recharge passage 23 and lifts the double beat valve 22, so that fluid is supplied to passage 24 and piston chamber 17. From piston chamber 17, fluid flows through passages 33 past check valve 34 to the supplemental reservoir 31 and through the restricted port 36 to valve chamber 19.

Since the brake cylinder is now at atmospheric pressure, the outer face of piston 26 is at atmospheric pressure and the same will be held in its outer position by spring 27.

When an application of the brakes is made, the triple valve piston 4 moves the slide valves 8 and 9 so as to connect port 10 with passage 11, and fluid is supplied in the usual manner from the auxiliary reservoir 7 to brake cylinder 13.

The outward movement of piston 4 in applying the brakes, causes passage 23 to be connected to the auxiliary reservoir side of the piston, so that piston chamber 17 is now subject to auxiliary reservoir pressure. When the auxiliary reservoir pressure has been slightly reduced by flow to the brake cylinder, the supplemental reservoir pressure in valve chamber 19 will exceed the auxiliary reservoir pressure in piston chamber 17 and the piston 18 will then be moved so as to engage a spring stop 39. This movement operates valve 21 so that cavity 40 connects port 41 which registers with passage 29 to a port 42 which registers with passage 33 and consequently fluid will be supplied from the supplemental reservoir 31 to brake cylinder 13.

When the brake cylinder pressure, by flow from the auxiliary reservoir and supplemental reservoir, builds up to a predetermined degree, the same acting on the outer exposed area of piston 26 will move said piston from its seat and since the full area of the piston will then be subjected to brake cylinder pressure, the quick movement of the piston to its inner seat will be effected. This movement operates to shift the double beat valve 22, causing the charging valve to close and the vent valve to open, so that fluid is vented from piston chamber 17 to exhaust port 25.

The piston 18 is thereupon shifted to its outer seat, cutting off the further flow of fluid from the supplemental reservoir to the brake cylinder. Since the piston 26 is controlled by brake cylinder pressure, it will be evident that the initial application of the brakes will always produce a predetermined brake cylinder pressure, regardless of the auxiliary reservoir volume or the brake cylinder piston travel.

In releasing after a brake application, the brake pipe pressure forces the triple valve piston 4 to release position, and fluid is released from the brake cylinder through cavity 14 and exhaust port 15. Port 23 is also connected to the brake pipe, so that fluid at brake pipe pressure is supplied to the lower valve of double beat valve 22. When the brake cylinder pressure has been reduced to a predetermined degree, the piston 26 will be shifted to its outer seat by the spring 27, and the brake pipe pressure will then lift the double beat valve 22, so that fluid from the brake pipe is supplied to piston chamber 17.

When the brake pipe pressure rises to a point slightly higher than supplemental reservoir pressure, the piston 18 will be moved by the spring stop 39, shifting the auxiliary valve 21, so as to uncover port 43 which now registers with exhaust port 44.

Fluid is thereupon vented from valve chamber 19, more rapidly than fluid can flow from the supplemental reservoir through the restricted port 36 and consequently the brake pipe pressure in chamber 17 will force the piston 18 to release position. In this position, passage 33 is uncovered, so that the supplemental reservoir is quickly recharged from the brake pipe.

The booster valve construction may also be utilized to effect a quicker release of the brakes and for this purpose, passage 29 may be connected in the release position of the booster valve through port 41, cavity 40, and port 45 with exhaust port 44, thus providing an additional exhaust for the brake cylinder.

In order to prevent possible leakage past the outer seat of piston 26 from building up a pressure on the full area thereof, a by-pass 46 is provided around the piston, so that any leakage of fluid can escape by way of the exhaust port 25.

Having now described my invention, what I claim as new and desire to secure by Letters Patent, is:

1. In a fluid pressure brake, the combination with a brake cylinder, a brake pipe, an auxiliary reservoir, and a valve device operated upon a gradual reduction in brake pipe pressure for supplying fluid to the brake cylinder to effect a service application of the brakes, of a supplemental reservoir and means operated upon a predetermined reduction in auxiliary reservoir pressure in a service application of the brakes for supplying fluid from the supplemental reservoir to the brake cylinder.

2. In a fluid pressure brake, the combination with a brake cylinder, a brake pipe, an auxiliary reservoir, and a valve device operated upon a gradual reduction in brake pipe pressure for supplying fluid to the brake cylinder to effect a service application of the brakes, of a supplemental reservoir and a valve device subject to the opposing pressures of the auxiliary reservoir and supplemental reservoir and operated upon a predetermined reduction in auxiliary reservoir pressure in making a service application of the brakes for supplying fluid from the supplemental reservoir to the brake cylinder.

3. In a fluid pressure brake, the combination with a brake cylinder, a brake pipe, an auxiliary reservoir, and a valve device operated upon a reduction in brake pipe pressure for supplying fluid to the brake cylinder, of a supplemental reservoir, a valve device operated upon a predetermined reduction in auxiliary reservoir pressure for supplying fluid from the supplemental reservoir to the brake cylinder, and means actuated upon a predetermined increase in brake cylinder pressure for effecting the operation of said valve device to cut off the supply of fluid from the supplemental reservoir to the brake cylinder.

4. In a fluid pressure brake, the combination with an auxiliary reservoir, brake cylinder, and a valve device for supplying fluid from the auxiliary reservoir to the brake cylinder, of a supplemental reservoir, valve means for controlling the supply of fluid from the supplemental reservoir to the brake cylinder, a piston subject on one side to supplemental reservoir pressure for operating said valve means, a double beat valve for supplying fluid from the auxiliary reservoir to the opposite side of said piston, and a piston operated by brake cylinder pressure for actuating said double beat valve to vent fluid from said piston.

5. In a fluid pressure brake, the combination with a brake pipe, auxiliary reservoir, brake cylinder, and a valve device operated upon a reduction in brake pipe pressure for supplying fluid from the auxiliary reservoir to the brake cylinder, of a supplemental reservoir, valve means for controlling the supply of fluid from the supplemental reservoir to the brake cylinder, a piston subject on one side to supplemental reservoir pressure and on the opposite side to brake pipe pressure when said valve device is in release position and to auxiliary reservoir pressure in applying the brakes, a double beat valve normally establishing communication for supplying fluid to said piston, and a piston operated by brake cylinder pressure for actuating said double beat valve to cut off said communication and vent fluid from the piston which operates said valve means.

6. In a fluid pressure brake, the combination with a brake pipe, auxiliary reservoir, and brake cylinder, of a supplemental reservoir, a valve device subject on one side to supplemental reservoir pressure and operated upon a reduction in auxiliary reservoir pressure on the opposite side for supplying fluid from the supplemental reservoir to the brake cylinder, means operated upon an increase in brake cylinder pressure for venting fluid from said valve device to cut off the supply of fluid from the supplemental reservoir to the brake cylinder and means for supplying fluid from the brake pipe to said valve device in releasing the brakes for moving same to a position in which fluid is vented from the supplemental reservoir side to thereby effect the movement of said valve device to normal release position.

7. In a fluid pressure brake, the combination with an auxiliary reservoir and brake cylinder, of a supplemental reservoir and a valve device comprising a piston, a main valve, and an auxiliary valve movable relatively to said main valve by said piston upon a reduction in auxiliary reservoir pressure for supplying fluid from the supplemental reservoir to the brake cylinder.

8. In a fluid pressure brake, the combination with an auxiliary reservoir and brake cylinder, of a supplemental reservoir and a valve device comprising a piston, a main valve, and an auxiliary valve normally connecting the brake cylinder with an exhaust port, said auxiliary valve being movable relatively to the main valve by said piston upon a reduction in auxiliary reservoir pressure for supplying fluid from the supplemental reservoir to the brake cylinder.

In testimony whereof I have hereunto set my hand.

WALTER V. TURNER.

Copies of this patent may be obtained for five cents each, by addressing the "Commissioner of Patents, Washington, D. C."